Sept. 30, 1969  B. PERREN  3,469,702
APPARATUS FOR SEPARATING FLUID EARTH-OIL PRODUCTS
FROM AN EARTH-OIL-IN-WATER MIXTURE
Filed Sept. 25, 1967  2 Sheets-Sheet 1

INVENTOR.
Benno Perren
BY
Watson, Cole, Grindle & Watson
Attys.

United States Patent Office 3,469,702
Patented Sept. 30, 1969

3,469,702
APPARATUS FOR SEPARATING FLUID EARTH-OIL PRODUCTS FROM AN EARTH-OIL-IN-WATER MIXTURE
Benno Perren, Wettingen, Switzerland, assignor to Hectronic AG, Aarau, Switzerland
Filed Sept. 25, 1967, Ser. No. 670,215
Claims priority, application Switzerland, Sept. 26, 1966, 13,950/66
Int. Cl. B01d 23/10
U.S. Cl. 210—265
15 Claims

ABSTRACT OF THE DISCLOSURE

An apparatus for the separation of liquid petroleum products from a mixture of such products and water and comprising a container having a material contactable by the liquid having a higher wetting ability or affinity than water. The apparatus has separate outlets for the water freed from the petroleum products and the separated petroleum products.

---

The present invention relates to an apparatus for the separation of liquid petroleum products from a mixture of petroleum products and water, with a container provided with an inlet for the petroleum products and water mixture. The container contains a material contactable by the liquid, for which fluid petroleum products have a higher wetting ability or affinity than water, and is provided with separate outlets for the water freed from petroleum products and for the separated petroleum products.

Known apparatus for this purpose include a relatively large amount of the material contacted by the liquid in the container, on which the smallest particles of petroleum products accumulate and combine in time to form larger droplets. As soon as these droplets have attained a sufficient magnitude, because of their lower specific gravity with respect to water, they begin to travel upwardly along the surface of the material. In this way, a separation of the liquid petroleum products from the mixture and self-cleaning of the surface of the material take place. The self-cleaning ability of known devices is unsatisfactory in many cases, however, and also, these known devices frequently require considerable space and the installation costs are high.

It is an object of the present invention essentially to provide an apparatus for the separation of petroleum products from a mixture of petroleum products and water, in which the aforementioned disadvantages are minimized or avoided.

According to the invention, this is achieved essentially in that the material contactable by the liquid is directed into at least one filter, which separates the interior of the container into an inlet chamber and an outlet chamber and, in the latter chamber at a distance from the filter, a collector device is provided for collecting the petroleum products rising from the filter because of their natural buoyancy, the collector device forming at least a part of the limits of a collection zone and the uppermost portion of the collection zone being connected with an outlet for the separated petroleum products.

Further objects and details of the invention appear below in the following description of certain embodiments given in conjunction with the accompanying drawings, in which by way of example and in diagrammatic form:

FIGS. 1 to 5 are cross sectional views showing different embodiments of the apparatus in accordance with the invention, all in vertical section.

Figure 1:
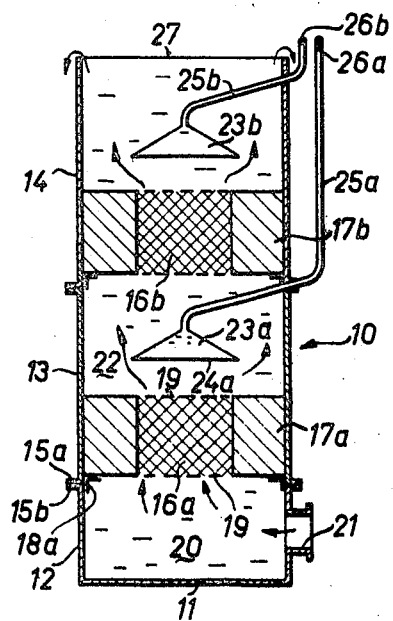

The embodiment according to FIG. 1 includes an upright cylindrical container 10 which is open at the top and is provided at the bottom with a flat base 11. The cylindrical housing of the container 10 is formed from three sections 12, 13 and 14 which are connected together by means of external flanges 15a and 15b and screw-threaded bolts which are not shown in the drawing. At a distance from the base 11, a cylindrical filter 16a is disposed in the container 10. The filter 16a is carried within a support ring 17a, the outer diameter of which is limited to the internal diameter of the housing section 13. The support ring 17a rests upon a sealing surface of an inwardly-directed peripheral flange 18a which is connected to the lower end of the housing section 13. The cylindrical filter 16a contains a material for which fluid petroleum products have a higher wetting ability or affinity than water. In the present embodiment, this material is polytetrafluoroethylene, which forms the filter layer 16a in the form of particles, that is, turnings, between upper and lower wire screen members 19. The wire screens 19 are stretched over the upper and lower openings of the support ring 17a and are anchored thereto.

An inlet connection pipe 21 discharges into the inlet chamber 20 surrounded by the lowermost housing section 12. The height of the filter 16a and the equally high support ring 17a are clearly less than the height of the second housing section 13 and the diameter of the filter 16a is less than the internal diameter of the container 10. The cross-section of the outlet chamber 22 defined above the filter 16a is thus greater than that of the outlet opening of the filter 16a covered by the upper wire screen member 19.

In the outlet chamber 22, a collector device 23a is arranged at a distance from the outlet opening of the filter 16a, which device 23a has the form of a funnel, the inlet opening 24a of which faces downwardly toward the outlet opening from the filter 16a. The funnel 23a and the filter 16a have a longitudinal axis coincident with that of the container 10. The diameter of the inlet opening 24a of the conical funnel 23a is greater than the diameter of the outlet opening of the filter 16a, so that the latter opening is always located within the vertical projection of the funnel 23a serving as the collector device.

The conical funnel 23a defines a collection zone surrounded thereby, the highest portion of which is connected by means of a riser tube 25a with an outlet connection 26a for the separated fluid petroleum products. The outlet connection 26a discharges freely into a receiver (not shown in the drawing) which is at atmospheric pressure.

In the housing section 14, which is carried by the housing section 13, a support ring 17b is likewise mounted in the way already described, together with a filter 16b and a collector device 23b discharging into a riser tube 25b. The container 10 thus contains a cascade of two filters 16a and 16b with associated collector devices 23a and 23b, wherein the outlet chamber 22 of the first filter 16a is at the same time the inlet chamber of the second filter 16b.

The upper edge 27 of the top open container 10 forms a free overflow weir for the water released from the petroleum products. The free overflow weir 27 for the water lies somewhat lower than the free overflow connections 26a and 26b for the petroleum products, since with at least partial filling of the riser tubes 25a and 25b with petroleum products which are lighter than water, the former rise to a higher level than the water level 27. In this way, water outflow from the overflow connections 26a and 26b for the petroleum products is avoided.

The mode of operation of the embodiment according to FIG. 1 is as follows. The mixture of petroleum products and water to be purified is forced under a sufficiently high but limited pressure into the inlet chamber 20 by way of the inlet pipe 21, so that a maximum allowable throughput or flow per unit time is not exceeded. From the inlet chamber 20, the liquid flows upwardly through the filter 16a. In the filter 16a, the most finely dispersed petroleum product particles, because of their higher wetting ability, accumulate on the surfaces of the portions of polytetrafluoroethylene forming the filter contents. Because of the upwardly-directed flow and the natural buoyancy involved, the surface layer of the petroleum products causes them to rise up the p.t.f.e. turnings. Consequently, combination of many smaller petroleum product particles to ones of larger diameters occurs, which products are then released from the outlet of the filter in the form of larger droplets when the flow and buoyancy forces are greater than the forces of adhesion. Droplet sizes of 3 to 5 mm. diameters are readily attainable.

Because of the increasing flow cross-section above the filter 16a, the velocity of flow of the fluid in the outlet chamber 22 directly downstream from the filter 16a is less than in the filter 16a. The maximum throughput per unit time is selected so that the radially-outwardly directed components of the water of flow between the filter 16a and the funnel opening 24a are so low that the petroleum product droplets released from the filter 16a, which rise with a relatively higher velocity, do not pass to the outside of the collection zone of the funnel 23a. The maximum throughput per unit time must not be greater than a critical value at which renewed emulsification within the filter 16a would occur.

The droplets of petroleum products passing into the collection zone of the funnel 23a rise into the tube 25a. As soon as the column of petroleum products in the tube 25a has risen sufficiently high, the separated petroleum products flow out from the overflow tube 26a, in accordance with the amounts coming in.

In the second filter layer 16b, the liquid is purified in an analogous way a second time, the particles of petroleum products separating in the filter 16b being collected, after discharge from the filter opening, by the funnel 23b and rising into the petroleum product outlet 26b. The water produced at the upper edge 27 of the container 10 includes a considerably lesser proportion of petroleum products than the fluid located in the outlet chamber 22 of the first filter 16a.

In a modification not shown in the drawing, the container 10 can be closed at the top and the water flowing through the outlet can stand under a predetermined pressure. In this case, the petroleum product outlets are provided with suitably controlled or self-regulating outlet valves, which only open when a sufficiently high column of petroleum products is present in the riser tubes 25a and 25b.

Figure 2:
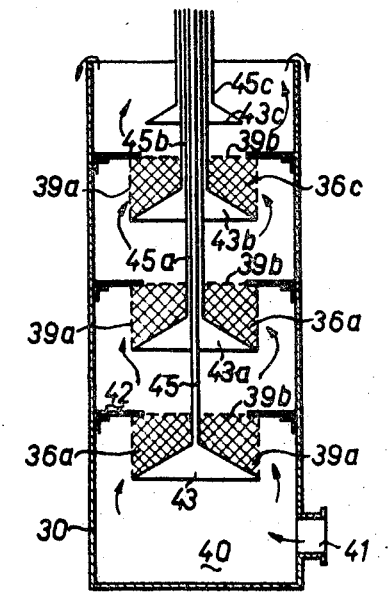

The embodiment illustrated in FIG. 2 is different from that shown in FIG. 1, in that the inlet chamber 40 includes a collector device 43 in the form of a funnel, the collection zone of which discharges into an upwardly-directed tube 45. The collector device 43 has the purpose of collecting larger particles of petroleum products from the mixture of petroleum products and water entering by the inlet 41 and passing then by the first filter 36a. Also, three filters 36a, 36b and 36c, are located in the container 30. The filter 36a is located on that side of the collector device 43 associated with the inlet chamber 40 which faces towards the outlet chamber 42. The two other filters 36b and 36c lie in analogous ways on the collector devices 43a and 43b. The liquid passes through the cylindrical peripheries of the filters 36a, 36b and 36c, which are surrounded by wire screen members 39a, and into the filters themselves and then leaves at the upper axial sides which are covered in each case by means of wire screens 39b. The riser tubes 45, 45a, 45b and 45c are coaxially arranged so that the riser tube of each collection zone is surrounded along at least a part of its length with the tube of the following collection zone.

The mode of operation of the second embodiment corresponds to that of the first, with the exception that some separation of large particles of petroleum products takes place in the inlet chamber 40. The advantage of the second embodiment with respect to the first resides in the smaller overall height and in the simplicity of installation and supervision of the filters 36a, 36b and 36c, as a result of the central introduction of the concentric riser tubes 45, 45a, 45b and 45c.

Figure 3:
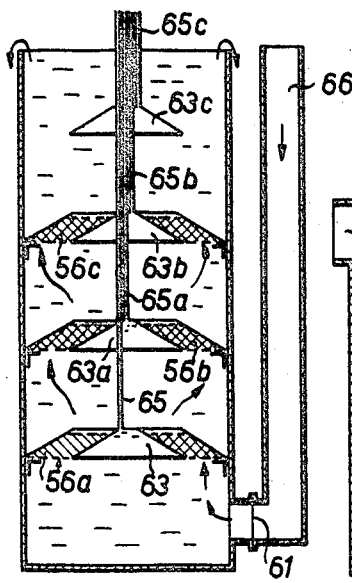

The third embodiment according to FIG. 3 corresponds in construction and mode of operation to that illustrated in FIG. 2. The heights of the outwardly frusto-conical filters 56a, 56b and 56c in this embodiment are lower and are only the same as the funnels 63, 63a, 63b and 63c forming the collector devices. In this way, the overall height is further reduced. Also in the embodiment according to FIG. 3, the riser tubes 65, 65a, 65b and 65c lead upwardly parallel to one another and the inlet connection 61 is in communication with a down tube 66 so that the apparatus can be sunk in the ground, for example.

Figure 4:
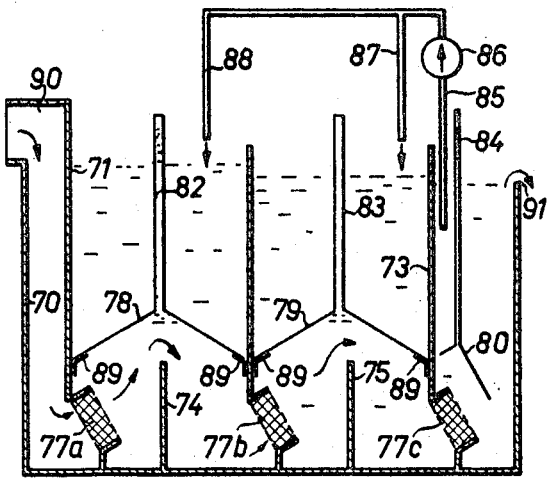

Because of its inexpensive construction, the embodiment illustrated in FIG. 4 is especially suitable for factories, garages and like installations. In this embodiment, a well 70 is divided by walls 71, 72 and 73 and also by partitions 74 and 75 into inlet and outlet chambers. At the lower end portion of each wall 71, 72 and 73, an opening is provided in which an inclined filter element 77a, 77b and 77c is located. Above each of the partition walls 74 and 75, an inverted V-shaped funnel 78 or 79 is disposed between the walls 71, 72 and 73 respectively, while a funnel-shaped collector device 80 is associated with the last filter 77c. The two first funnels 78 and 79 thus rest on angle members 89 which are connected to the walls 71, 72 and 73. For reasons given in detail later, sealing of the installation adjacent the funnels 78 and 79 is dispensed with. The supply of the mixture of petroleum products and water to the first filter 77a is effected by way of an upright inlet 71. The highest parts of the funnels 78, 79 and 80 are each connected with riser tubes 82, 83 and 84 which discharge into a collector chamber for the separated petroleum products which is not illustrated in the drawing.

In the space virtually filled with pure water above the last funnel 80 is inserted a suction tube 85 which is in communication with the inlet to a pump 86. The outlet from the pump 86 connects with two tubes 87 and 88 of which the tube 88 discharges into a chamber lying above the funnel 78 and the tube 87 is connected to one above the funnel 79.

The mode of use and operation of the fourth embodiment are as follows: In its path of movement from the feed opening 90 into the inlet 71 and on to the outlet formed as an overflow weir 91, the liquid passes successively through the three filters 77a, 77b and 77c. In the filters in the way already described, the petroleum products are separated and are collected by the collector devices. From the practically pure water which is located in the space above the last funnel 80, a portion is pumped into the chambers located above the funnels 78 and 79 by the suction tube 85 and the pump 86. Because the funnels 78 and 79 are not sealed on the angle members 89, this water flows into the spaces beneath the funnels 78 and 79. In this way, oil droplets are prevented from rising between the partitions 71, 72 and 73 and the edges of the funnels 78 and 79. The water pumped into the chamber above the funnels 78 and 79 thus acts as a barrier liquid.

Figure 5:
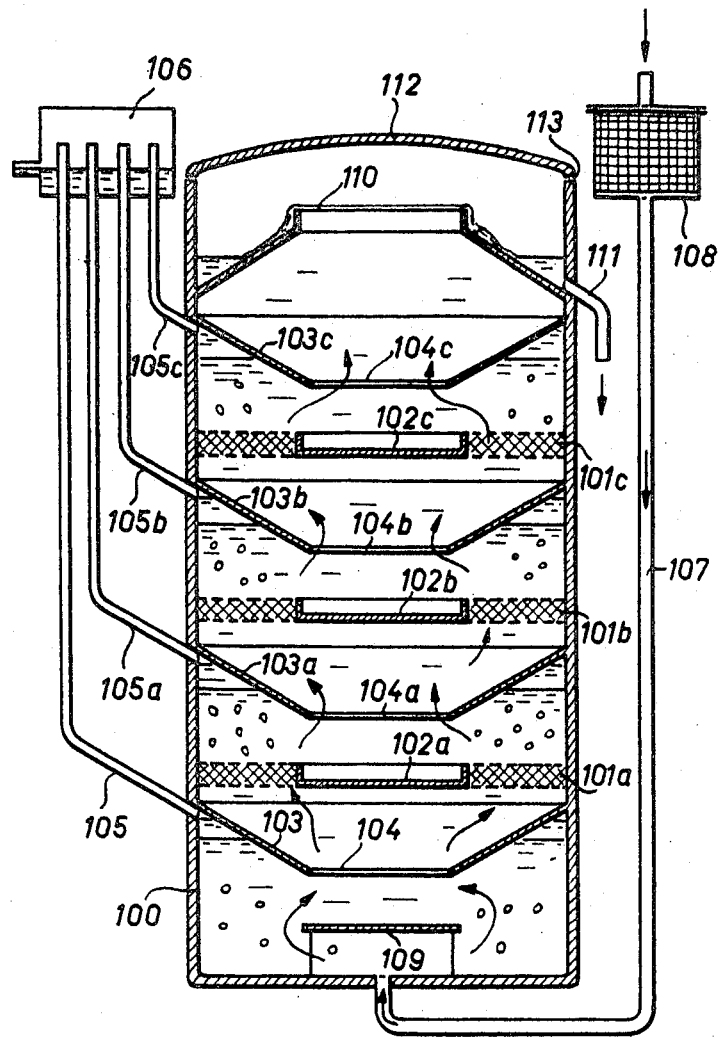

The embodiment according to FIG. 5 includes an upright cylindrical container 100 in which three annular filters 101a, 101b and 101c are arranged in step arrangement. The central openings surrounded by these filter rings 101a, 101b and 101c are closed by circular intermediate plates 102a, 102b and 102c so that the fluid can only flow through the filters. The collector devices 103, 103a, 103b and 103c are also annular and are connected at their outer peripheries to the inner walls of the container 100. The collector devices 103, 103a, 103b and 103c are substantially funnel-shaped but, in contrast to the other embodiments, their central smaller openings 104, 104a, 104b and 104c are respectively somewhat lower than the outer periphery of the edges of the funnels. The collector zones for the petroleum products thus lie between the undersides of the funnels and the container walls. The petroleum products collecting in the zones are discharged by riser tubes 105, 105a, 105b and 105c into a petroleum collecting chamber 106. In an inlet pipe 107 for the mixture of petroleum products and water, discharging into the base of the container 100, a coarse filter 108 is inserted which serves to retain solid impurities. In order that the first collector device 103 shall receive the greatest possible proportion of larger petroleum product particles, a plate 109 for diversion of the flow is arranged at a distance from the base of the container 100 above the outlet from the pipe 107. The space above the uppermost collector device 103c is narrowed in funnel shape in order to form an overflow outlet 110 for the purified water. In the overflow outlet 110, for additional purification, an absorption filter can be inserted. The purified water flows from an outlet 111. In order that the overflow discharge shall take place under atmospheric pressure, a cover 112 is provided so as to leave a small air gap 113 between it and the top of the container 100. The mode of operation is analogous to that already described with reference to FIGS. 1 to 3.

I claim:

1. A device for the separation of liquid petroleum products from a mixture of petroleum products and water, comprising a container provided with an inlet for the mixture of petroleum products and water, separate outlets for the water freed from the petroleum products and for the separated petroleum products, and at least one filter comprising a material for which liquid petroleum products have a higher affinity ability than for water, and which is polytetrafluoroethylene, the filter serving to separate the inside of the container into an inlet chamber to which the inlet is connected and an outlet chamber in which a collector device spaced from the filter is provided for the collection of petroleum products rising from the filter because of its buoyancy, the collector device at least partly defining a collection zone having its uppermost portion in connection with the outlet for the separated petroleum products.

2. A device according to claim 1, in which the outlet opening of the filter lies within the vertical projection of the collection zone.

3. A device according to claim 1, in which the outlet opening of the filter lies within the vertical projection of the collector device.

4. A device according to claim 1, in which the collector device is a funnel, the inlet opening of which faces the outlet opening of the filter.

5. A device according to claim 1, in which an uppermost portion of the collection zone communicates by means of a riser tube with the outlet for the separated petroleum products.

6. A device according to claim 1, in which the outlet for the water freed from petroleum products and the outlet for the separated petroleum products are free overflow outlets which discharge into a space at atmospheric pressure, the overflow discharge for the water being lower than the overflow discharge for the petroleum products.

7. A device according to claim 1, in which the flow cross-section in the outlet chamber is greater than an outlet opening of the filter.

8. A device according to claim 1, in which the inlet chamber is associated with a collector device which serves to collect larger particles of petroleum products from the mixture of petroleum products and water introduced by the inlet.

9. A device according to claim 1, in which the filter is located on the side of the collector device facing the inlet chamber which is adjacent the outlet chamber.

10. A device according to claim 1, in which additional filters and associated collector devices are provided in the container in step arrangement with respect to the first filter so that the space between the two filters is the outlet chamber for the preceding filter and the inlet chamber for the succeeding filter.

11. A device according to claim 1, in which a plurality of filters are provided each located on a collector device associated with the preceding filter.

12. A device according to claim 1, in which a riser tube is provided for each collection zone and is surrounded over at least a part of its length with the riser tube of a succeeding collection zone.

13. A device according to claim 1, in which the filter and the collector device are of annular shape and the collector device is connected at its outer periphery with inner walls of the container.

14. A device according to claim 1, in which a central opening of the collector device is lower than its outer periphery.

15. A device according to claim 1, in which the material contacted by the liquid in the filter is polytetrafluoroethylene in the form of turnings.

References Cited

UNITED STATES PATENTS

| 1,193,970 | 8/1916 | Bacher | 210—339 X |
| 1,873,597 | 8/1932 | Jones | 210—23 |
| 3,055,505 | 9/1962 | Lawson | 210—335 |
| 3,231,091 | 1/1966 | Kingsbury et al. | 210—335 |

FOREIGN PATENTS

| 11,254 | 3/1903 | Austria. |
| 189,766 | 4/1888 | France. |

REUBEN FRIEDMAN, Primary Examiner

FRANK A. SPEAR, Jr., Assistant Examiner

U.S. Cl. X.R.

210—284, 301, 336, 540